(12) United States Patent
Ikeda

(10) Patent No.: US 7,864,239 B2
(45) Date of Patent: Jan. 4, 2011

(54) LENS BARREL AND IMAGING APPARATUS

(75) Inventor: Eiichiro Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 11/008,431

(22) Filed: Dec. 8, 2004

(65) Prior Publication Data

US 2005/0128340 A1 Jun. 16, 2005

(30) Foreign Application Priority Data

Dec. 11, 2003 (JP) ............................. 2003-413985

(51) Int. Cl.
G03B 13/00 (2006.01)
(52) U.S. Cl. ...................... 348/345; 348/349; 348/354; 348/223.1
(58) Field of Classification Search ......... 348/345–357, 348/223.1
See application file for complete search history.

(56) References Cited

U.S. PATENT DOCUMENTS

| | | | |
|---|---|---|---|
| 4,752,831 A * | 6/1988 | Biber et al. ................. | 348/349 |
| 6,130,716 A | 10/2000 | Hirasawa | |
| 6,545,710 B1 * | 4/2003 | Kubo et al. ............... | 348/223.1 |
| 6,788,812 B1 * | 9/2004 | Wilkins ...................... | 382/167 |
| 7,148,922 B2 * | 12/2006 | Shimada ................... | 348/224.1 |
| 2001/0010556 A1 * | 8/2001 | Sugimoto et al. ........... | 348/345 |
| 2003/0156206 A1 * | 8/2003 | Ikeda et al. ............... | 348/223.1 |
| 2003/0197803 A1 | 10/2003 | Watanabe et al. | |
| 2007/0247542 A1 | 10/2007 | Watanabe et al. | |

FOREIGN PATENT DOCUMENTS

| | | | |
|---|---|---|---|
| JP | 59-062810 | | 4/1984 |
| JP | 63-031293 | | 2/1988 |
| JP | 10254004 A | * | 9/1998 |
| JP | 2003-295041 | | 10/2003 |
| JP | 2003-307669 | | 10/2003 |

* cited by examiner

Primary Examiner—Tuan Ho
Assistant Examiner—Paul Berardesca
(74) Attorney, Agent, or Firm—Canon USA Inc IP Div

(57) ABSTRACT

An optical apparatus includes a focus adjustment unit which controls a focusing lens such that the focusing lens is driven to an in-focus position using a signal obtained by photoelectric conversion of an image of an object, the image being formed by an optical system including the focusing lens; and a color temperature detection unit which detects a color temperature of the object. The manner in which the focusing lens is driven differs depending on the color temperature.

4 Claims, 8 Drawing Sheets

LENS BARREL AND IMAGING APPARATUS

BACKGROUND OF THE INVENTION

Field of the Invention

The present invention relates to a lens barrel for focusing an image of an object on an imaging device, and more specifically relates to an arrangement of a motor and the like installed in the lens barrel.

In a typical electronic imaging apparatus, such as a digital camera and a video camera, having a two-dimensional imaging device, sharpness of a screen is detected on the basis of a video signal obtained as a result of photoelectric conversion performed by the imaging device, and focus adjustment is performed by controlling the position of a focusing lens so that a maximum sharpness is obtained. The sharpness is detected from, for example, the intensity of a high-frequency component of the video signal extracted by a bandpass filter or a detection intensity of a blur width at an edge of the object obtained by differentiating the video signal with a differentiating circuit.

Normally, the sharpness is small when the object is out of focus, increases as the object comes into focus, and reaches a maximum when the object is completely in focus. In a known method for controlling the focusing lens, when the sharpness is low, the focusing lens is moved as quickly as possible in a direction such that the sharpness increases. The velocity of the focusing lens is gradually reduced as the sharpness increases, and the focusing lens is stopped with high accuracy at the point where the sharpness is at a maximum. This method is commonly called a hill-climbing autofocus (hereafter abbreviated as hill-climbing AF) method.

In another known control method, when a shoot button is operated by a first stroke, the focusing lens is gradually moved from an infinity end to a close end while shooting an object at a plurality of positions. The image data obtained by shooting the object is input to a sharpness detector, and the position of the focusing lens at which an image with the highest sharpness is obtained is determined as the in-focus position. This method is called an entire-scan AF (refer to Japanese Patent Laid-Open No. 5-048952).

However, the above-described methods for controlling the focusing lens have disadvantages in that when, for example, the focusing lens is moved from the infinity end to the close end, an AF time required when the object is relatively close, as in the case of shooting a person, is longer than that required when the object is located at infinity, as in the case of shooting a landscape.

In addition, when the focusing lens is moved with small steps in order to increase the AF accuracy, the time required for shooting and signal processing is increased and the AF time is increased accordingly.

SUMMARY OF THE INVENTION

According to one aspect of the present invention, an optical apparatus includes a focus adjustment unit which controls a focusing lens such that the focusing lens is driven to an in-focus position using a signal obtained by photoelectric conversion of an image of an object, the image being formed by an optical system including the focusing lens, and a color temperature detection unit which detects a color temperature of the object. The focus adjustment unit changes a control method for driving the focusing lens depending on the color temperature.

According to another aspect of the present invention, an optical apparatus includes a focus adjustment unit which controls a focusing lens such that the focusing lens is driven to an in-focus position using a signal obtained by photoelectric conversion of an image of an object, the image being formed by an optical system including the focusing lens, and an information obtaining unit which obtains first information regarding white balance control, the first information being selected by a user. The focus adjustment unit changes a control method for driving the focusing lens depending on the first information.

According to the optical apparatus (for example, a camera with a built-in lens, a single-lens reflex camera, or an interchangeable lens) of the first aspect of the present invention, the focusing lens is quickly and easily moved to a position where high-frequency signals for AF are obtained. In addition, the position at which the focusing lens is focused at the object placed near the close end is quickly determined.

If it is determined that the object is placed indoors, the focus adjustment unit sets a starting position from which the focusing lens is driven to a position near a close end. Accordingly, the in-focus position of the object placed near the close end is quickly determined.

If it is determined that the object is placed outdoors, the starting position from which the focusing lens is driven is set to a position near the infinity end. Accordingly, the in-focus position of the object placed near the infinity end is quickly determined.

A driving direction of the focusing lens may be changed depending on the color temperature. In such a case, for example, first, the focusing lens is moved to the middle point between the close end and the infinity end, and is then moved toward the close end if it is determined that the object is placed indoors from the color temperature information of the object and toward the infinity end if it is determined that the object is placed outdoors from the color temperature information of the object. Thus, the in-focus position of the object is quickly determined.

The focus adjustment unit determines whether the object is placed indoors or outdoors in accordance with the color temperature. If it is determined that the object is placed indoors, the amount of movement in a region near the close end is set smaller than the amount of movement in a region near the infinity end. In such a case, the number of focus detection points is reduced (the amount of movement is increased) as the focusing lens moves away from the in-focus position of the object placed near the close end. Therefore, the moving velocity of the focusing lens increases in a region distant from the in-focus position, and the in-focus position is quickly determined.

As described above, the focus adjustment unit determines whether the object is placed indoors or outdoors according to the color temperature. If it is determined that the object is placed outdoors, the amount of movement in a region near the infinity end is set smaller than the amount of movement in a region near the close end. In such a case, the number of focus detection points is reduced (the amount of movement is increased) as the focusing lens moves away from the in-focus position of the object placed near the infinity end. Therefore, the moving velocity of the focusing lens increases in a region distant from the in-focus position, and the in-focus position can be quickly determined.

In addition, a control method for driving the focusing lens may be changed depending on setting information regarding white balance control. In such a case, even when a large blur occurs in the image of the object and high-frequency signals cannot be obtained, the focusing lens is quickly and easily moved to a position where high frequency signals for AF are obtained.

The setting information may represent the kind of a light source, and the focus adjustment unit may determine whether the light source is a first light source or a second light source which is brighter than the first light source. If it is determined that the light source is the first light source, the starting position from which the focusing lens is driven is set closer to the close end compared to the case in which it is determined that the light source is the second light source. In such a case, the focusing lens is quickly moved to the in-focus position of the object placed near the close end in accordance with the setting information.

In addition, if it is determined that the light source is the first light source (for example, fluorescent light), the focus adjustment unit may set the starting position from which the focusing lens is driven to the close end. In such a case, the focusing lens is quickly moved to the in-focus position of the object placed at the close end.

If it is determined that the light source is the second light source, the focus adjustment unit may set the starting position from which the focusing lens is driven to the infinity end. In such a case, the focusing lens is quickly moved to the in-focus position of the object placed at the infinity end.

The focus adjustment unit may change a driving direction of the focusing lens depending on the setting information. In such a case, for example, first, the focusing lens is moved to the middle point between the close end and the infinity end, and is then moved toward the close end if it is determined that the object is placed indoors from the setting information and toward the infinity end if it is determined that the object is placed outdoors from the setting information. Thus, the in-focus position of the object is quickly determined.

The setting information may represent the kind of a light source, and the focus adjustment unit may determine whether the light source is a first light source or a second light source which is brighter than the first light source. If it is determined that the light source is the first light source, the amount of movement in a region near the close end is set smaller than the amount of movement in a region near the infinity end. In such a case, the number of focus detection points is reduced (the amount of movement is increased) as the focusing lens moves away from the in-focus position of the object placed near the close end. Therefore, the moving velocity of the focusing lens increases in a region distant from the in-focus position, and the in-focus position is quickly determined.

As described above, the setting information may represent the kind of the light source, and the focus adjustment unit may determine whether the light source is the first light source or the second light source which is brighter than the first light source. If it is determined that the light source is the second light source, the amount of movement in a region near the infinity end is set smaller than the amount of movement in a region near the close end. In such a case, the number of focus detection points is reduced (the amount of movement is increased) as the focusing lens moves away from the in-focus position of the object placed near the infinity end. Therefore, the moving velocity of the focusing lens increases in a region distant from the in-focus position, and the in-focus position is quickly determined.

Further objects, features and advantages of the present invention will become apparent from the following description of the preferred embodiments with reference to the attached drawings.

DESCRIPTION OF THE PREFERRED EMBODIMENTS

First Embodiment

Figure 1:
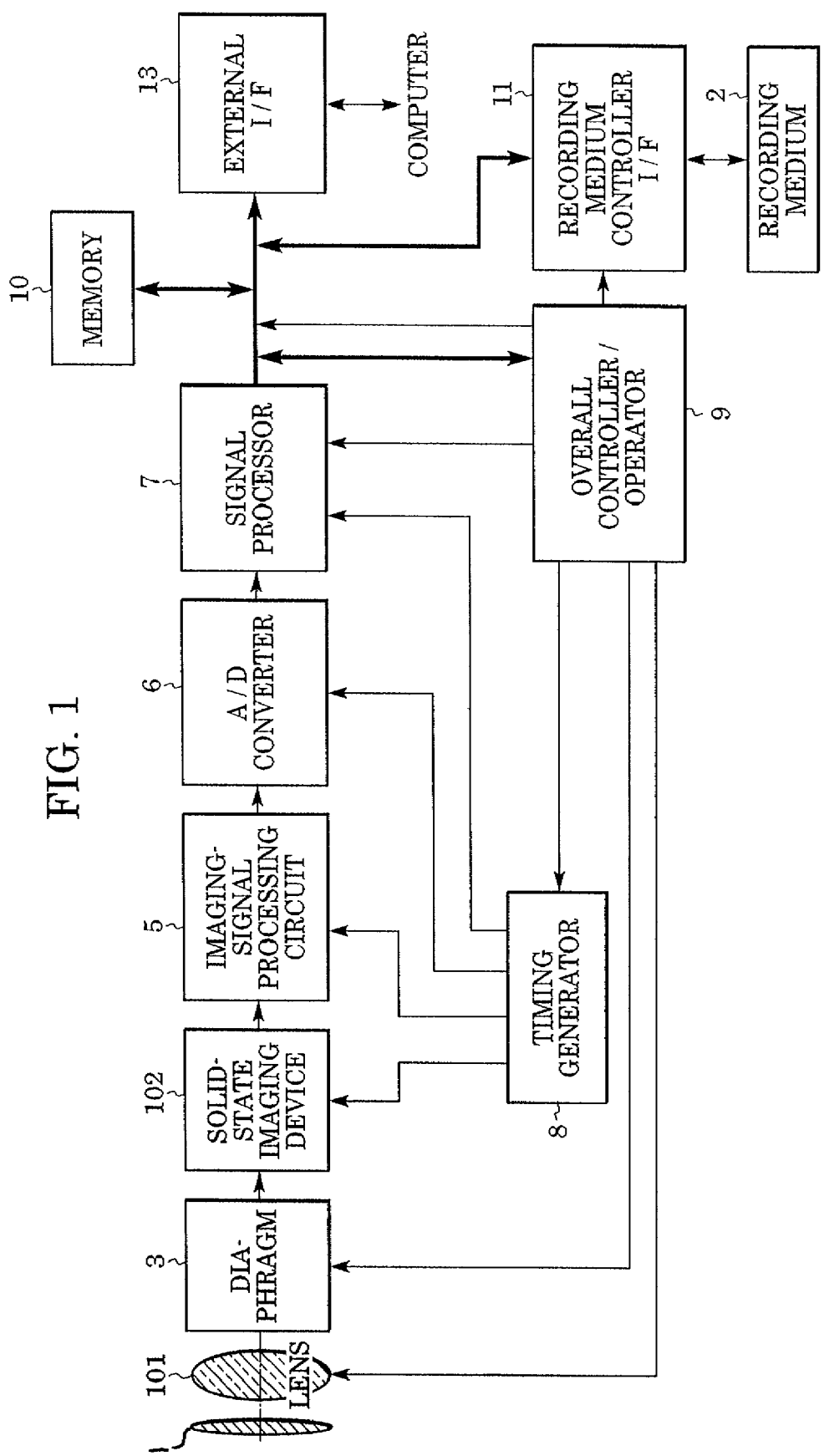
FIG. 1 is a block diagram showing an optical apparatus according to a first embodiment of the present invention.

FIG. 1 is a block diagram showing an optical apparatus (imaging apparatus) according to a first embodiment of the present invention. With reference to the figure, the optical apparatus includes a barrier 1 which protects a lens 101 and which also functions as a main switch; the lens 101 which forms an optical image of an object on a solid-state imaging device 102; a diaphragm 3 for varying the amount of light transmitted through the lens 101; the solid-state imaging device 102 for capturing the object image formed by the lens 101 as an image signal; an imaging-signal processing circuit 5 including a gain-varying amplifier which amplifies the image signal output from the solid-state imaging device 102 and a gain corrector for correcting the gain; an A/D converter 6 which performs analog-to-digital (A/D) conversion of the image signal output from the solid-state imaging device 102; a signal processor 7 which performs various corrections of the image data output form the A/D converter 6 and compresses the data; a timing generator 8 which outputs various timing signals to the solid-state imaging device 102, the imaging-signal processing circuit 5, the A/D converter 6, and the signal processor 7; an overall controller/operator 9 which performs various operations and controls the overall imaging apparatus; a memory 10 for temporarily storing the image data; a recording-medium controller interface (I/F) 11 for recording or reading out the image data to/from a detachable recording medium 12; the detachable recording medium 12, such as a semiconductor memory, for recording or reading out the image data; and an external interface (I/F) 13 for communicating with an external computer or the like.

Next, the operation of the imaging apparatus having the above-described structure in a shooting process will be described below.

First, a main power source is turned on, and then a power source of the control system and power sources of circuits, such as the A/D converter 6, in the imaging system are turned on.

Then, the overall controller/operator 9 opens the diaphragm 3 to control the amount of exposure, and a signal output form the solid-state imaging device 102 is processed by the A/D converter 6 and is input to the signal processor 7. This data is used in the exposure operation performed by the overall controller/operator 9.

Brightness is determined from the result of photometry, and the overall controller/operator 9 controls the diaphragm 3 in accordance with the determined brightness.

Next, a high-frequency component is extracted from the signal output from the solid-state imaging device 102 and a distance to the object is calculated by the signal processor 7 and the overall controller/operator 9. Then, the lens is driven to determine whether or not the lens is in focus. If it is determined that an in-focus state is not obtained, the lens is driven to perform the distance measurement again.

Then, main exposure is started after it is determined that the in-focus state is obtained.

After the exposure, the image signal output from the solid-state imaging device 102 is subjected to the A/D conversion by the A/D converter 6, and is written in the memory 10 by the signal processor 7 and the overall controller/operator 9.

Then, the data stored in the memory 10 is recorded in the detachable recording medium 12, such as a semiconductor memory, through the recording-medium controller I/F 11 under the control of the overall controller/operator 9.

In addition, the data may also be directly input to a computer or the like via the external I/F 13 for processing the image.

Figure 2:
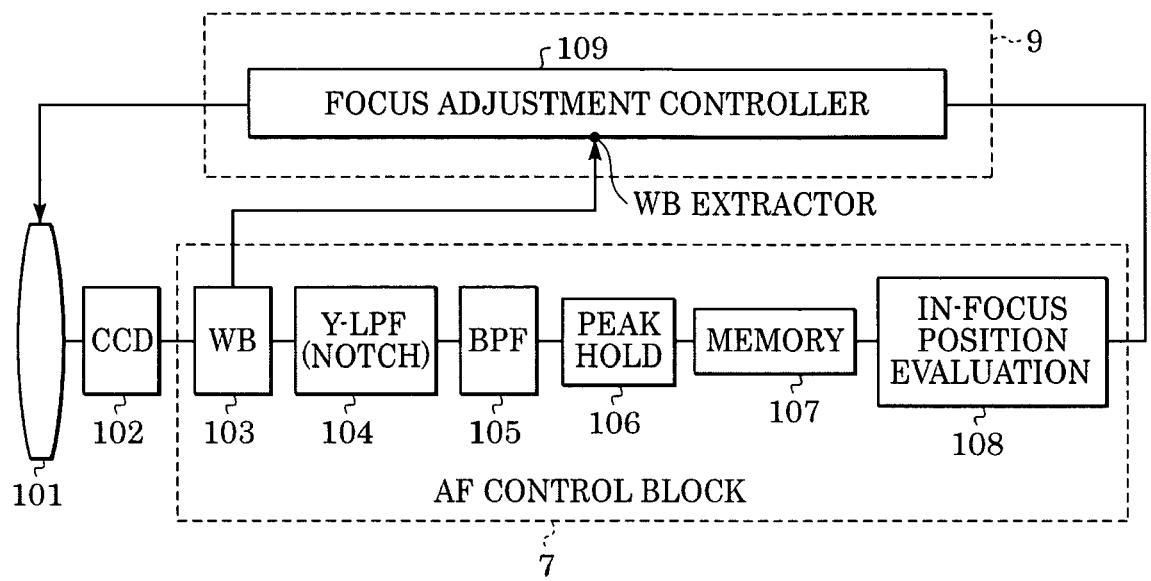
FIG. 2 is a circuit diagram showing an AF control block according to the first embodiment.

FIG. 2 is a circuit diagram of an AF control block in the imaging apparatus according to the present embodiment. The operation of the imaging apparatus in autofocus control will be described below with reference to FIG. 2. In FIG. 2, unit blocks corresponding to the components described above with reference to FIG. 1 are denoted by the same reference numerals.

Light reflected by the object (not shown) passes through the lens 101 including a focusing lens, forms an image on an imaging surface of the imaging device 102 (for example, a CCD, a CMOS image sensor, etc.), and is subjected to photoelectric conversion. An image signal obtained by the photoelectric conversion is fed to a white balance (WB) block 103 (color temperature detection unit), where a gain of each color filter is adjusted. The image data output from the WB block 103 is fed to a Y-LPF block 104, where an adequate low-pass filter (LPF) is applied in horizontal/vertical directions to limit the frequency range, and a high-frequency signal is detected by a BPF circuit 105 for each horizontal line.

Figure 8:
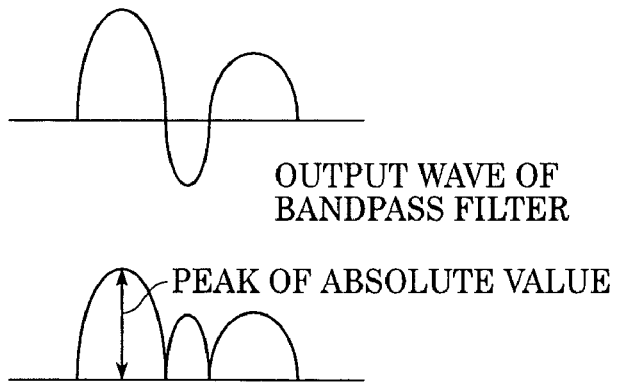
FIG. 8 is a diagram showing the output from a bandpass filter.
Figure 9:
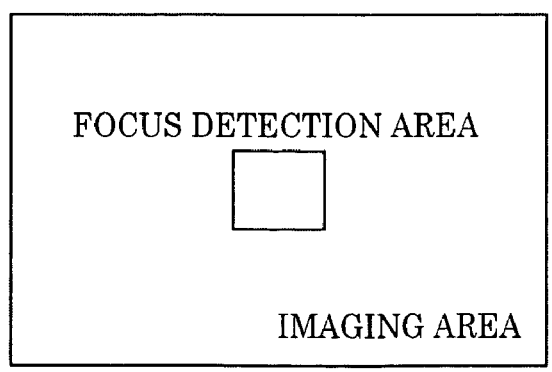
FIG. 9 is a diagram showing an imaging area and a focus detection area.

Next, the maximum absolute value of the output signal from the BPF circuit 105 is output from a peak-hold circuit 106 for each horizontal line (FIG. 8). This functions as a high-frequency signal for AF. The high-frequency signal for AF is obtained for all of the horizontal lines in a focal-point detection area (FIG. 9) set in advance, and is recorded in a memory 107. Then, the sum of the high-frequency signals for all of the lines is calculated.

Figure 3:
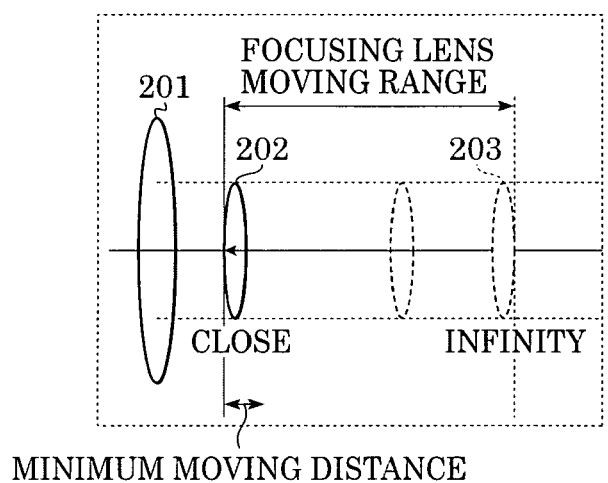
FIG. 3 is a schematic diagram showing the movement of a focusing lens according to the first embodiment.

FIG. 3 is a schematic diagram showing the operation of the focusing lens. A focus adjustment controller 109 (focus adjustment unit) sets the focusing lens at a position where the focusing lens is focused at infinity (hereafter called the infinity end) and calculates the high-frequency signals. Next, the focusing lens is moved by a predetermined small distance (hereafter called a single step), and the high-frequency signals are calculated by shooting the object at this position. This process is repeated, and the focusing lens is stopped at a position where the sum of the high-frequency signals is at a maximum. This position is determined as the in-focus position (hill-climbing method).

The hill-climbing method will be described in detail below with reference to a flowchart shown in FIG. 5.

First, in Step 501, an AF-evaluation signal, which represents the state of focus of an optical system, is obtained using the high-frequency signals detected by the BPF circuit 105 while the focusing lens is at the infinity end in FIG. 3. This AF-evaluation signal is obtained for the first time, and no AF-evaluation signal for comparison is stored in the memory 107.

Accordingly, the focusing lens is driven one step toward the close end in Step 503, and the AF-evaluation signal (signal for evaluating the focus state) is obtained at this position in Step 501. Then, in Step 504, it is determined whether this AF-evaluation signal is greater or less than the AF-evaluation signal obtained at the infinity end. If it is determined that the AF-evaluation signal obtained after driving the focusing lens one step is greater than that obtained at the infinity end in Step 504, the focusing lens is driven one step further toward the close end in Step 503, and the AF-evaluation signal obtained at this position is compared with that obtained in the previous cycle in Step 504.

The above-described routine "comparison between the AF-evaluation signals→one-step driving of the focusing lens→acquisition of the AF-evaluation signal" is repeated until it is determined that the AF-evaluation signal obtained in the current cycle is less than that in the previous cycle. If it is determined that the AF-evaluation signal obtained in the current cycle is less than that in the previous cycle, the driving direction of the focusing lens is reversed in Step 506 and the focusing lens is driven one step closer to the infinity end in Step 503.

Then, in Step 501, the AF-evaluation signal is obtained at the position where the focusing lens is driven one step backward. If the obtained AF-evaluation signal is greater than that obtained in the previous cycle, this position is determined as the in-focus position in Step 507.

In the case in which the entire-scan method is applied, the object is shot at all of AF step points (points to which the focusing lens can be moved), and the sum of the high-frequency signals is calculated for each point. Then, an in-focus position determination block 108 determines the step point where the sum of the high-frequency signals is the largest as the in-focus position, and the focusing lens is moved to the determined in-focus position. Then, the main shooting process is performed.

The entire-scan method will be described in more detail below with reference to a flowchart shown in FIG. 6.

First, in Step 601, the focusing lens is driven to the infinity end in FIG. 3, and the AF-evaluation signal obtained at this position is recorded in the memory 107. Then, in Step 602, the focusing lens is moved to the next AF step point. The moving area of the focusing lens includes a plurality of AF step points, and the AF-evaluation signal is obtained at all of the AF step points in the entire-scan method.

Steps 601 and 602 are repeated until the AF-evaluation signal at the last AF point is obtained (Step 603).

When the AF-evaluation signals at all of the AF points are recorded in the memory 107, the process proceeds to Step 604 from Step 603, and the AF-evaluation signals recorded in the memory 107 are compared with one another to determine the AF point corresponding to the largest AF-evaluation signal as the in-focus position.

After the in-focus position is determined, the focus adjustment controller 109 drives the focusing lens to the in-focus position in Step 605. Accordingly, the shooting operation is performed in the in-focus state.

The above-described control methods for driving the focusing lens are commonly used in imaging apparatuses. In these control methods, the starting position from which the focusing lens is driven (that is, the position of the focusing lens at which the first AF-evaluation signal is obtained) is set to the infinity end.

In comparison, in the present embodiment, the starting position from which the focusing lens is driven is changed depending on the color temperature of the object.

More specifically, it is determined whether the object is placed indoors or outdoors on the basis of color temperature information of the object. The starting position from which the focusing lens is driven is set to the infinity end if it is determined that the object is placed outdoors, and is set to the close end if it is determined that the object is placed indoors. The reason for this is because the object tends to be located near infinity when it is placed outdoors, and tends to be relatively close when it is placed indoors. Accordingly, in the hill-climbing AF method, the moving time of the focusing lens (focusing time) in which the focusing lens is moved from the starting position to the in-focus position is reduced.

In the case in which driving of the focusing lens is controlled by the entire-scan method, when the object is placed outdoors, the step width at which the focusing lens is driven is set small in the range from the infinity end to the position where the focusing lens is focused at about 3 m (the distance of 3 m is obtained experimentally), and is set large in the range from the position where the focusing lens is focused at about 3 m to the close end. In contrast, when the object is placed indoors, the step width at which the focusing lens is driven is set small in the range from the close end to the position where the focusing lens is focused at about 3 m, and is set large in the range from the position where the focusing lens is focused at about 3 m to the infinity end. Accordingly, the time required for focusing is reduced in the AF process and the accuracy of the in-focus position is increased.

Figure 4:
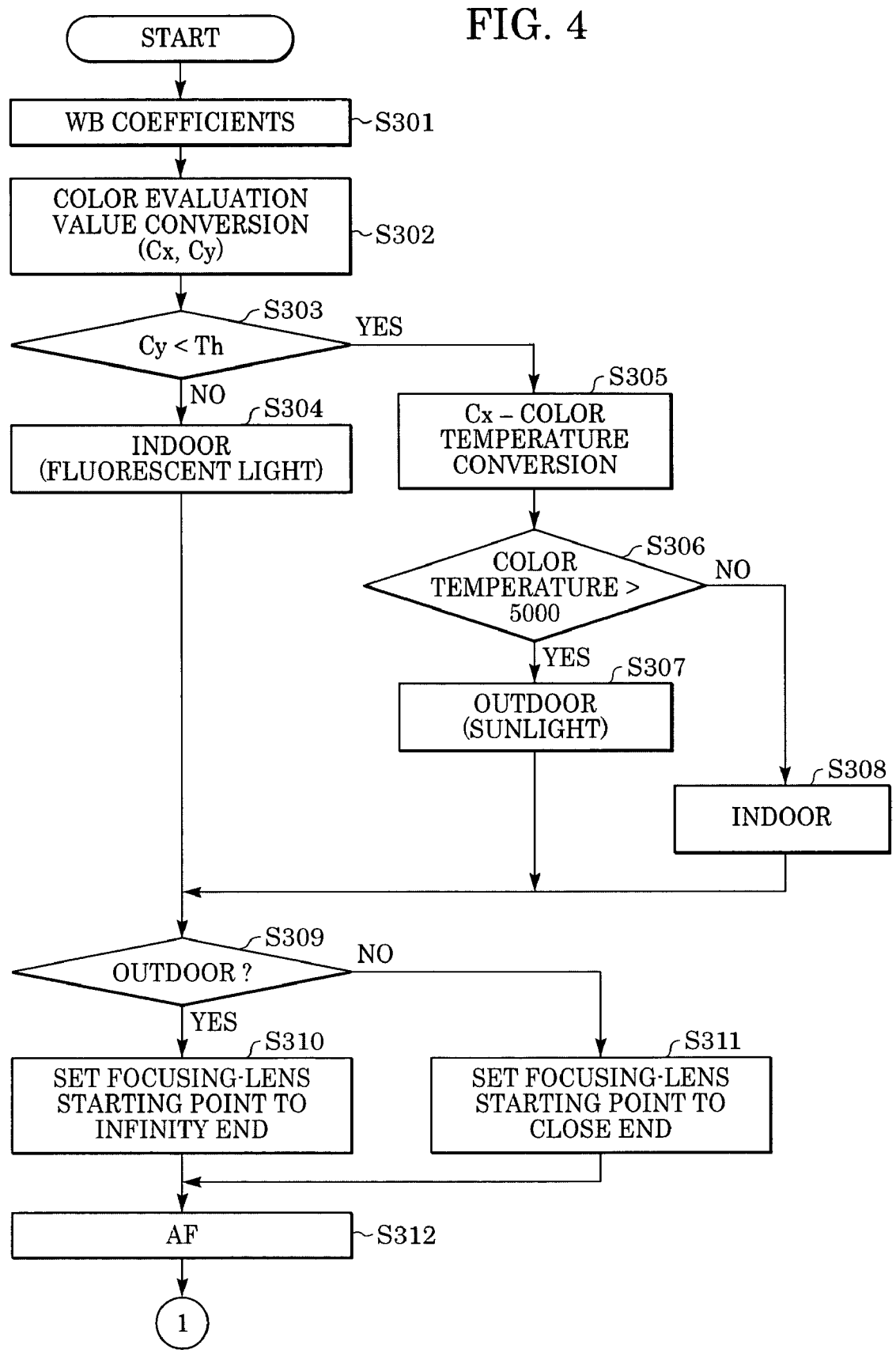
FIG. 4 is an operational flowchart of a process of driving the focusing lens according to the first embodiment.

Next, the drive control of the focusing lens according to the present embodiment will be described in detail below with reference to FIG. 4. FIG. 4 is a flowchart showing the control procedure in the process of driving the focusing lens.

First, in Step 301, the WB block 103 calculates WB coefficients on the basis of the output signal from the imaging device 102.

Figure 10:
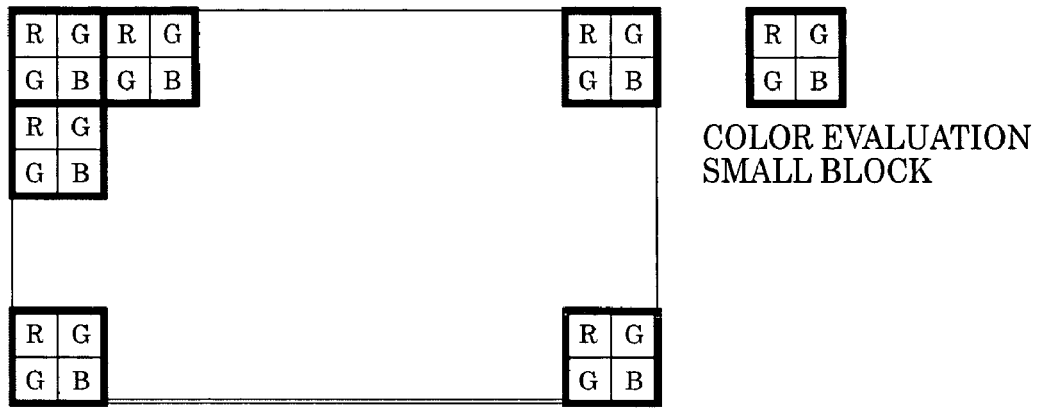
FIG. 10 is a diagram showing white-balance detection blocks.

A method for calculating the WB coefficients will be described below. The digitalized output signal from the imaging device is divided into a plurality of blocks as shown in FIG. 10, and color evaluation values are calculated for each block as follows:

$Cx=(R-B)/Y$ $Cy=(R+B-2G)/Y$ $Y=(R+G+B)/2$

When the calculated color evaluation values are included in a predetermined detection region (hereafter called a white detection region), it is assume that the block is white. A gain (amplification factor) for adjusting the white balance is calculated on the basis of the block assumed to be white.

Figure 11:
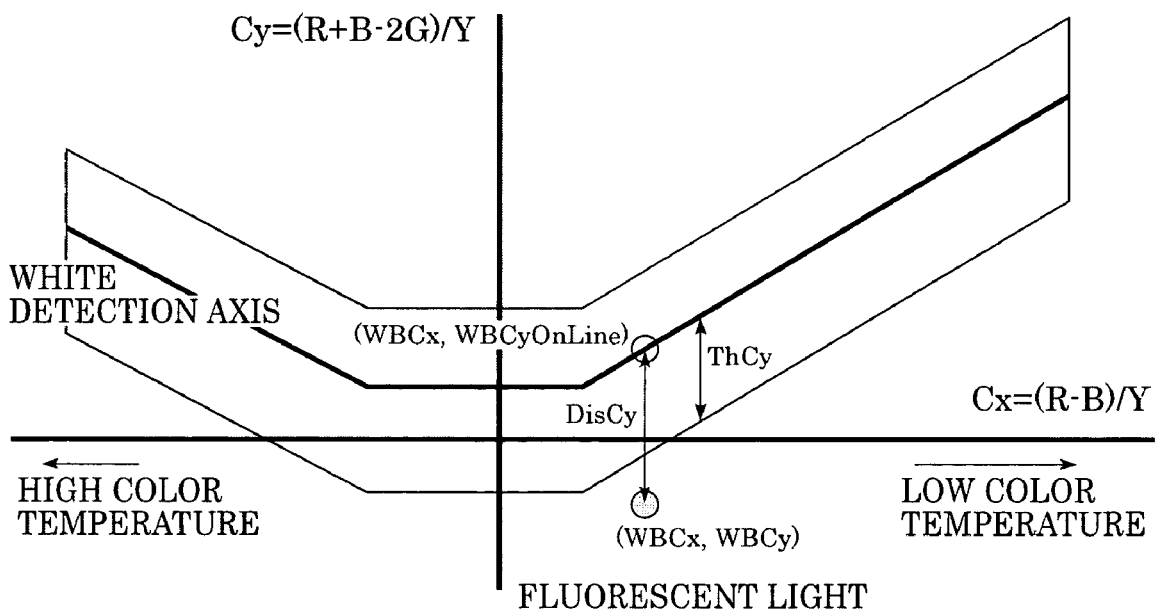
FIG. 11 is a diagram showing a white detection axis and a white detection region (color evaluation value coordinates).

FIG. 11 is a graph showing an example of a white detection region. A white background is shot under a light source with a color temperature varying from a high color temperature to a low color temperature at an arbitrary color-temperature step width in advance, and the color evaluation values are calculated from the signal obtained from the imaging device and are plotted on the graph. The Cx axis shows the color temperature and the Cy axis shows the degree of fluorescent light.

Then, in Step 302, the WB coefficients (WBCoR, WBCoG, and WBCoB) are converted into color evaluation values (WBCx and WBCy) as follows:

$PixelValueR=1/WBCoR$ $PixelValueG=1/WBCoG$ $PixelValueB=1/WBCoB$ $WBCx=(PixelValueR-PixelValueB)/PixelY$ $WBCy=(PixelValueR+PixelValueB-(PixelValueG)\times 2)/PixelY$ $PixelY=(PixelValueR+PixelValueG+PixelValueB)/2$ Then, in Step 303, Cy and CyOnLine on the color valuation axis at WBCx shown in FIG. 11 are calculated, and these values are substituted into the following equation to obtain the degree of fluorescent light DisCy.

$DisCy=CyOnLine-Cy$

If the calculated DisCy is equal to or greater than a predetermined threshold ThCy (reference value for determining whether shooting is performed under the fluorescent light), it is determined that the object is placed indoors in Step 304.

If the calculated DisCy is less than the threshold ThCy, the color temperature of the object is calculated from WBCx in Step 305. Since the white detection axis is set by shooting the white background at various color temperatures in advance, the color temperature can be determined from Cx.

Then, if the color temperature of the object is 5000 K or more, it is determined that the object is placed outdoors (Steps 306 and 307). If the color temperature of the object is less than 5000 K, it is determined that the object is placed indoors (Step 308).

If it is determined that the object is placed outdoors, the focus adjustment controller 109 outputs a drive signal to move the focusing lens to the infinity end (starting position of the focusing lens) shown in FIG. 3 (Steps 309 and 310).

Figure 7:
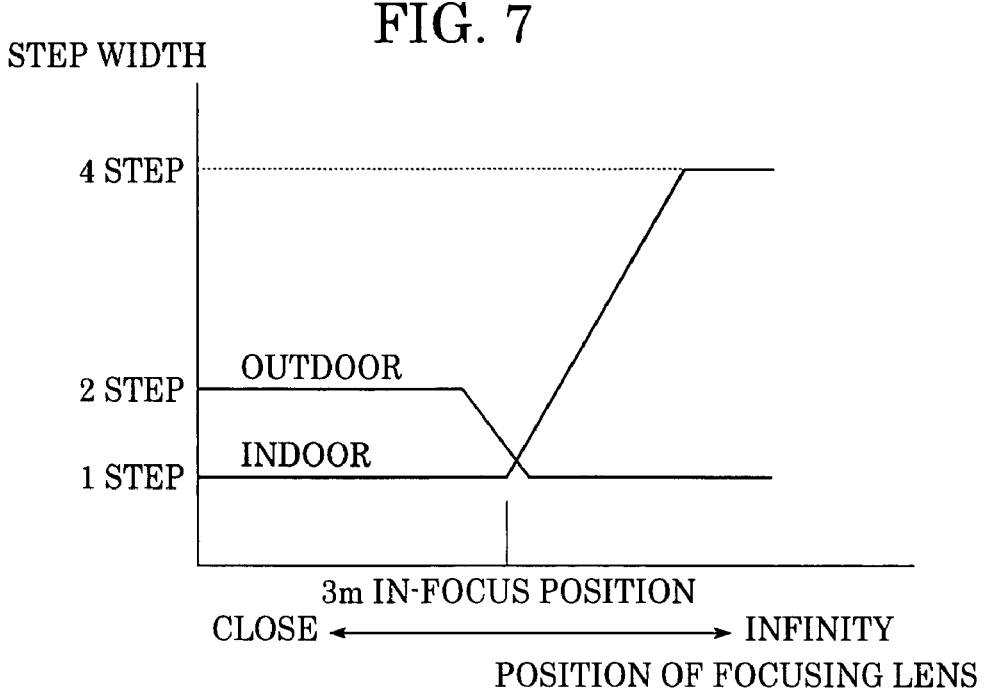
FIG. 7 is a graph showing the relationship between the position of the focusing lens and the amount of movement (scan step width) of the focusing lens according to the first embodiment.

In the case in which the object is shot outdoors, the step width is preferably varied depending on the position of the focusing lens, as shown in FIG. 7. More specifically, the focusing lens is finely moved with a small step width (the amount of movement is set small) while it is near the infinity end, and is roughly moved at a large step width (the amount of movement is set large) while it is near the close end. When the object is shot outdoors, the object often comes into focus at a position near the infinity end, and accordingly the time required for focusing is reduced by driving the focusing lens in the above-described manner. In addition, in the entire-scan method, the time required for focusing can be reduced by limiting the scan range to the range from the infinity end to a position near the close end (about 1 m).

Figure 5:
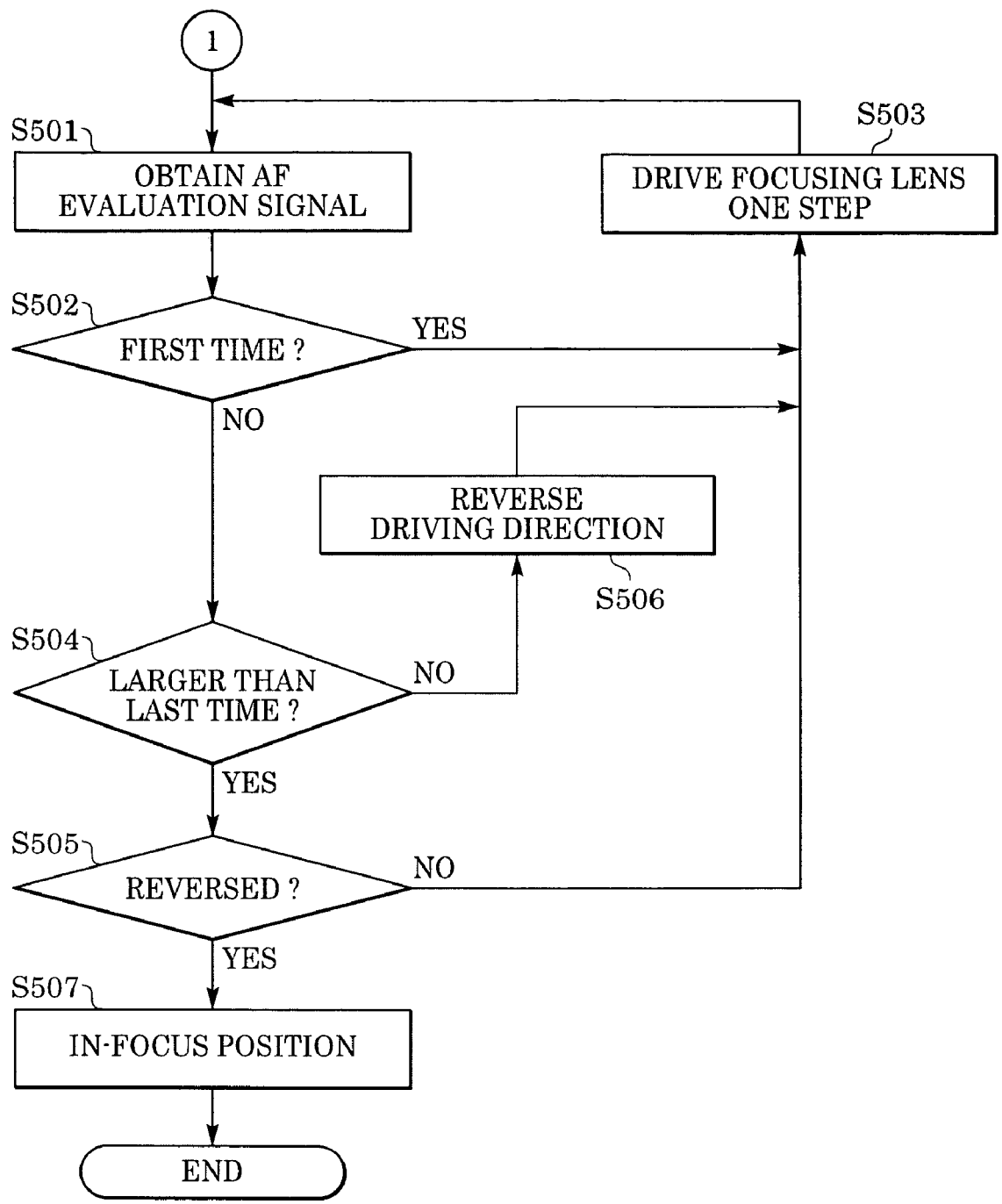
FIG. 5 is an operational flowchart of a process of driving the focusing lens using a hill-climbing method.
Figure 6:
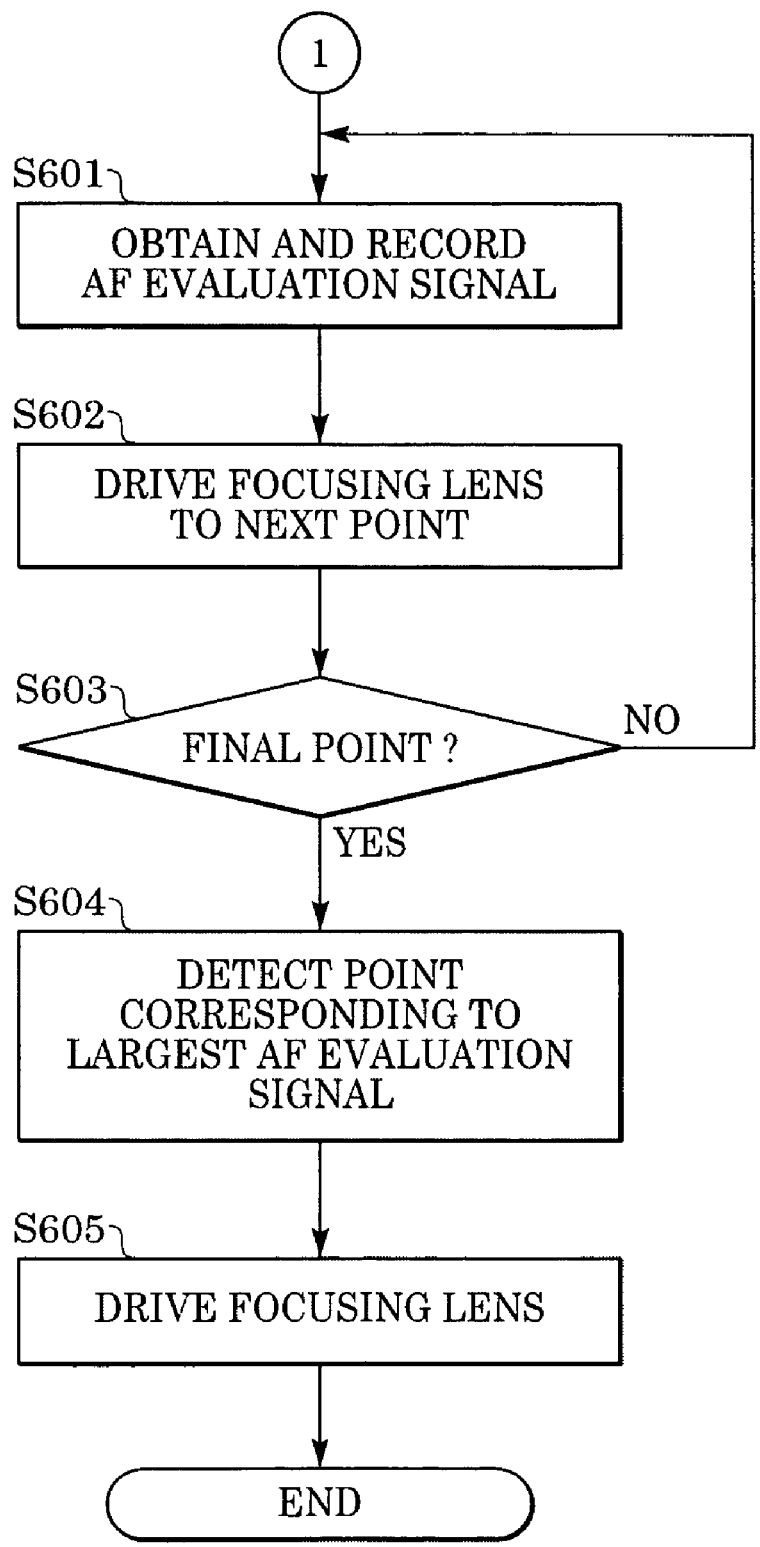
FIG. 6 is an operational flowchart of a process of driving the focusing lens using an entire-scan method.

After the focusing lens is moved to the starting position, the operation of focus adjustment is started and the drive control of the focusing lens is performed in accordance with the flowchart shown in FIG. 5 or FIG. 6.

If it is determined that the object is placed indoors, the focus adjustment controller 109 outputs a drive signal to move the focusing lens to the close end (starting position of the focusing lens) shown in FIG. 3 (Steps 309 and 311).

In the case in which the object is shot indoors, the step width is preferably varied depending on the position of the focusing lens, as shown in FIG. 7. More specifically, the focusing lens is roughly moved at a large step width while it is near the infinity end, and is finely moved at a small step width while it is near the close end. When the object is shot indoors, the object often comes into focus at a position near the close end, and accordingly the time required for focusing is reduced by driving the focusing lens in the above-described manner. In addition, in the entire-scan method, the time required for focusing can be reduced by limiting the scan range to the range from the close end to a position near the infinity end (about 3 m).

After the focusing lens is moved to the starting position, the operation of focus adjustment is started and the drive control of the focusing lens is performed in accordance with the flowchart shown in FIG. 5 or FIG. 6.

In the present embodiment, it is determined whether the object is placed indoors or outdoors on the basis of the color temperature information of the object. However, the accuracy of determination may be increased by combining the object brightness information used in an auto exposure (AE) process and the color temperature information. In this case, for example, it is determined that the object is placed outdoors when the brightness of the object is large or an upper region of the screen is particularly bright.

In addition, flash ON/OFF information may also be used in addition to the color temperature information of the object. In this case, it is determined that the object is placed indoors when the flash is on. When the flash is on, the main object is likely to be close even when it is shot outdoors. Accordingly, the starting position of the focusing lens is set to the close end and the step width is set small in a region near the close end and large in a region near the infinity end. Thus, the focusing speed is increased.

The driving direction may also be set instead of the starting position. For example, first, the focusing lens is moved to the middle point between the close end and the infinity end, and is then moved toward the close end if it is determined that the object is placed indoors from the color temperature information of the object and toward the infinity end if it is determined that the object is placed outdoors.

Second Embodiment

In the first embodiment, it is determined whether the object is placed indoors or outdoors on the basis of the color temperature information obtained as the result of an auto white balance process. Then, the control method for driving the focusing lens is changed depending on the result of the determination. In comparison, in the present embodiment, the control method for driving the focusing lens is changed when a user operates a manual WB switch for setting the WB.

The present embodiment will be described below with reference to an imaging apparatus in which manual WB is set to one of four modes: "clear", "cloudy", "fluorescent light", and "tungsten light". It is determined that the object is placed outdoors when "clear" or "cloudy" is set, and the focusing lens is driven similarly to the first embodiment. In addition, it is determined that the object is placed indoors when "fluorescent light" or "tungsten light" is set, and the focusing lens is driven similarly to the first embodiment.

Figure 12:
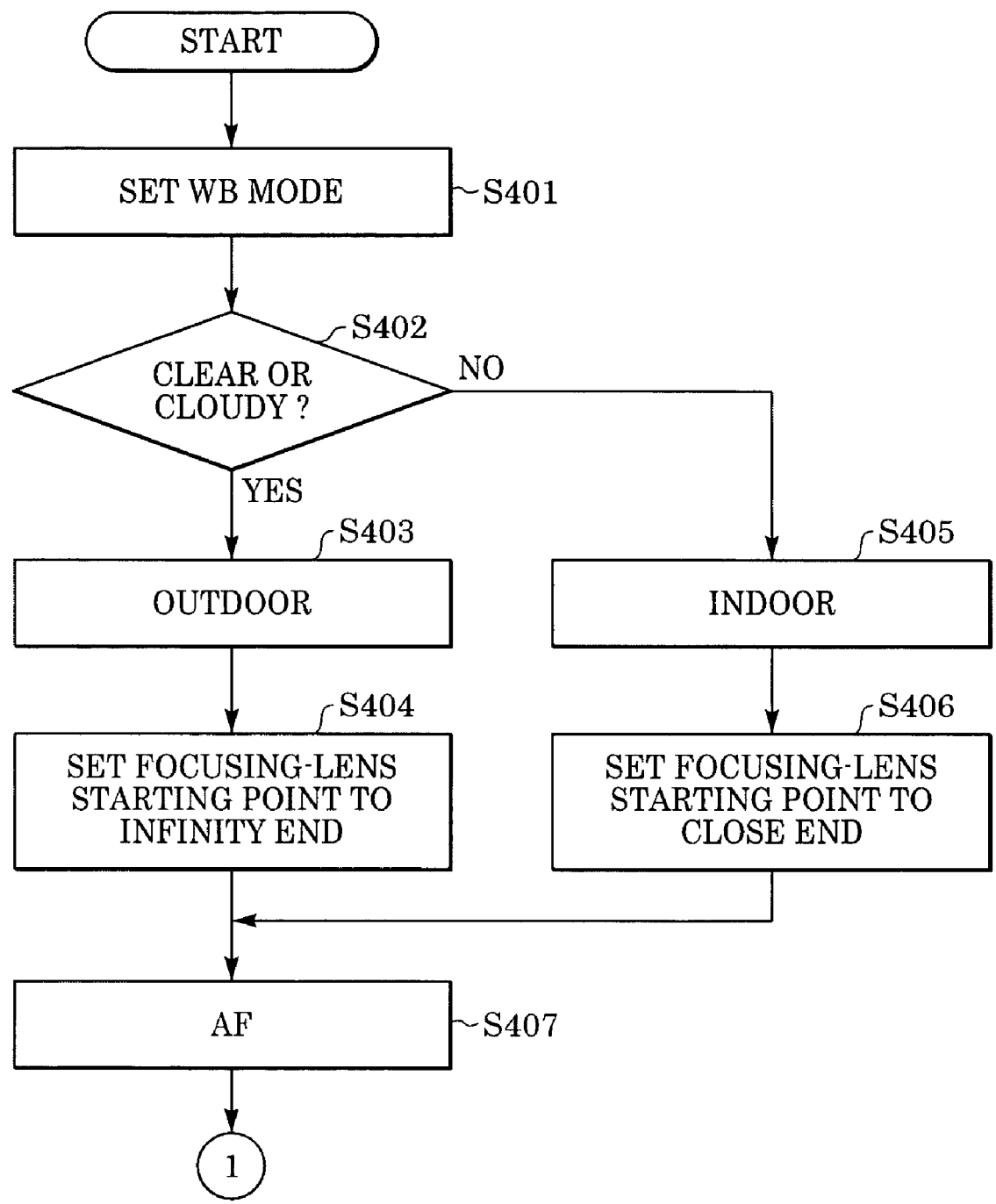
FIG. 12 is an operational flowchart of a process of driving a focusing lens according to a second embodiment.

Next, the drive control of the focusing lens according to the present embodiment will be described in detail below with reference to FIG. 12. FIG. 12 is a flowchart showing the control method for driving the focusing lens.

First, in Step 401, the user operates a mode switch (not shown) to set the white balance mode to one of "clear", "cloudy", "fluorescent light", and "tungsten light".

Then, if the white balance mode is set to "clear" or "cloudy", it is determined that the object is placed outdoors (Steps 402 and 403). If the white balance mode is set to "fluorescent light" or "tungsten light", it is determined that the object is placed indoors (Steps 402 and 405).

As described above, the position of the focusing lens at which the object is in focus is often near the infinity end when the object is shot outdoors, and is often near the close end when the object is shot indoors.

Accordingly, similar to the first embodiment, if it is determined that the object is placed outdoors, the starting position from which the focusing lens is driven is set to the infinity end in Step 404. If it is determined that the object is placed indoors, the starting position from which the focusing lens is driven is set to the close end in Step 406.

After the focusing lens is moved to the starting position, the operation of focus adjustment is started and the drive control of the focusing lens is performed in accordance with the flowchart shown in FIG. 5 or FIG. 6.

In the present embodiment, the control method for driving the focusing lens is changed using the information of white balance set by the user in the manual mode. Accordingly, the focusing time is reduced.

The present invention is applicable to any of cameras with built-in lenses, single-lens reflex cameras, and interchangeable lenses.

As described above, according to the first embodiment of the present invention, it is determined whether the object is placed indoors or outdoors on the basis of the color temperature information of the object. The starting point (position) from which the focusing lens is driven is set to the infinity end if it is determined that the object is placed outdoors, and is set to the close end if it is determined that the object is placed indoors. Therefore, the time required for focusing is reduced in the hill-climbing AF method.

In addition, when the object is placed outdoors, the step width at which the focusing lens is driven is set small in the range from the infinity end to the position where the focusing lens is focused at about 3 m, and is set large in the range from the position where the focusing lens is focused at about 3 m to the close end. When the object is placed indoors, the step width at which the focusing lens is driven is set small in the range from the close end to the position where the focusing lens is focused at about 3 m, and is set large in the range from the position where the focusing lens is focused at about 3 m to the infinity end. Thus, the time required for focusing is reduced in the entire-scan AF method.

According to the second embodiment of the present invention, it is determined whether the object is placed indoors or outdoors depending on the white balance mode designated by the user, and then the focusing lens is driven similarly to the first embodiment. Accordingly, the time required for focusing is reduced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-413985 filed Dec. 11, 2003, which is hereby incorporated by reference herein.

What is claimed is:

1. An optical apparatus comprising:
    a focus adjustment unit which controls a focusing lens such that the focusing lens is driven to an in-focus position using a high-frequency signal for auto-focus (AF) obtained at every photoelectric conversion of an image of an object, the image being formed by an optical system including the focusing lens; and
    a detection unit which detects first information and second information, from the signal, the first information being normalized information for a luminance signal and the first information being information corresponding to a degree of fluorescent light, and the second information being information corresponding to a color temperature of the object,
    wherein the focus adjustment unit changes, depending on the first information and the second information, a starting position from which the focusing lens is driven, a driving direction of the focusing lens and a step width of the focusing lens.

2. An optical apparatus comprising:
    a focus adjustment unit which controls a focusing lens such that the focusing lens is driven to an in-focus position using a high-frequency signal for auto-focus (AF) obtained at every photoelectric conversion of an image of an object, the image being formed by an optical system including the focusing lens; and
    a detection unit which detects first information and second information, from the signal, the first information being normalized information for a luminance signal and the first information being information corresponding to a degree of fluorescent light, and the second information being information corresponding to a color temperature of the object; and
    a determine unit configured to determine whether or not the object is placed outdoors based on the result of detection by the detection unit,
    wherein the focus adjustment unit sets, depending on the first information and the second information which are obtained at the every photoelectric conversion of the image of the object, a starting position from which the focusing lens is driven when the object is placed indoors closer to a close end than a starting position from which the focusing lens is driven when the object is placed outdoors, and
    wherein the focus adjustment unit changes, depending on the first information and the second information, a step width of the focusing lens.

3. The optical apparatus according to claim 2, wherein the starting position from which the focusing lens is driven when the object is placed indoors is set to the close end.

4. The optical apparatus according to claim 2, wherein the starting position from which the focusing lens is driven when the object is placed outdoors is set to an infinity end.

* * * * *